United States Patent
Clift et al.

(10) Patent No.: US 11,541,846 B2
(45) Date of Patent: Jan. 3, 2023

(54) ELECTROMAGNETIC WINDSHIELD WIPER SYSTEM

(71) Applicant: Tesla, Inc., Palo Alto, CA (US)

(72) Inventors: Nicolas Clift, Boulder Creek, CA (US); Maithreya Kedambadi Prasanna, Sunnyvale, CA (US); Gonzalo Espinoza Graham, Waterloo (CA)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/146,283

(22) Filed: Jan. 11, 2021

(65) Prior Publication Data
US 2021/0370884 A1 Dec. 2, 2021

Related U.S. Application Data

(63) Continuation of application No. 16/291,186, filed on Mar. 4, 2019, now Pat. No. 10,889,267.
(60) Provisional application No. 62/638,516, filed on Mar. 5, 2018.

(51) Int. Cl.
| | |
|---|---|
| *H02K 11/33* | (2016.01) |
| *B60S 1/16* | (2006.01) |
| *B60S 1/08* | (2006.01) |
| *B60S 1/44* | (2006.01) |
| *B60R 16/023* | (2006.01) |
| *B60S 1/04* | (2006.01) |

(Continued)

(52) U.S. Cl.
CPC .......... *B60S 1/0807* (2013.01); *B60S 1/0818* (2013.01); *B60S 1/16* (2013.01); *B60S 1/44* (2013.01); *H02K 11/33* (2016.01); *B60R 16/0231* (2013.01); *B60S 1/0402* (2013.01); *B60S 1/06* (2013.01); *B60S 1/3411* (2013.01); *B60S 1/3418* (2013.01); *B60S 1/3463* (2013.01)

(58) Field of Classification Search
CPC ........ B60S 1/0807; B60S 1/0818; B60S 1/16; H02K 11/33
See application file for complete search history.

(56) References Cited

U.S. PATENT DOCUMENTS

| | | | |
|---|---|---|---|
| 3,837,032 A * | 9/1974 | Ulbrich | ..................... B60S 1/08 15/250.17 |
| 5,023,530 A | 6/1991 | Ohashi | |
| 5,568,026 A | 10/1996 | Welch | |

(Continued)

*Primary Examiner* — Thai T Dinh
(74) *Attorney, Agent, or Firm* — Knobbe Martens Olson & Bear LLP

(57) ABSTRACT

An electromagnetic wiper system for a windshield of a vehicle includes a linear actuator, a wiper-arrangement, and control circuitry. The linear actuator includes at least one guide rail having permanent magnets and an electromagnetic moving block. The electromagnetic moving block includes at least one perforation that surrounds the at least one guide rail and at least one electromagnetic coil that surrounds the at least one perforation. The wiper-arrangement includes a wiper arm and a wiper blade, wherein at least the wiper arm is coupled to the electromagnetic moving block. The control circuitry controls a linear motion of the electromagnetic moving block along the at least one guide rail to steer the wiper arm that is coupled to the electromagnetic moving block back and forth across a length of the windshield to the windshield, wherein the electromagnetic moving block induces minimal friction during the linear motion.

19 Claims, 4 Drawing Sheets

(51) Int. Cl.
*B60S 1/34* (2006.01)
*B60S 1/06* (2006.01)

(56) References Cited

U.S. PATENT DOCUMENTS

| | | | |
|---|---|---|---|
| 5,860,185 A | | 1/1999 | Ponziani |
| 5,923,027 A | * | 7/1999 | Stam ............... H04N 5/225 250/341.7 |
| 6,157,154 A | | 12/2000 | Amagasa |
| 7,256,565 B2 | | 8/2007 | Merkel |
| 7,646,889 B2 | * | 1/2010 | Tsukamoto ........... B60S 1/0844 382/104 |
| 10,049,284 B2 | | 8/2018 | Jain et al. |
| 10,889,267 B2 | | 1/2021 | Cliff et al. |
| 2004/0143380 A1 | * | 7/2004 | Stam ............... G06V 20/584 340/467 |
| 2013/0275007 A1 | * | 10/2013 | Chen ............... G06V 20/56 701/49 |
| 2014/0306833 A1 | * | 10/2014 | Ricci ............... G06F 21/00 340/901 |
| 2017/0293808 A1 | * | 10/2017 | Jain ............... G06K 9/00791 |

* cited by examiner

ELECTROMAGNETIC WINDSHIELD WIPER SYSTEM

CROSS-REFERENCES TO RELATED APPLICATIONS

This application is a continuation of U.S. patent application Ser. No. 16/291,186, entitled "ELECTROMAGNETIC WINDSHIELD WIPER SYSTEM", filed Mar. 4, 2019, which claims priority to U.S. Provisional Application No. 62/638,516, entitled "ELECTROMAGNETIC WINDSHIELD WIPER SYSTEM", filed Mar. 5, 2018, each of which is hereby incorporated herein by reference in its entirety and made part of the present U.S. Utility patent application for all purposes.

FIELD

Various embodiments of the disclosure relate to a windshield wiper system. More specifically, various embodiments of the disclosure relate to an electromagnetic windshield wiper system that exhibits power efficiency and produces minimal friction during operation.

BACKGROUND

Advancements in the field of windshield cleaning systems and ergonomic vehicle design have led to an increase in the demand for windshield wiper systems that are not only visually appealing but are also effective in cleaning the windshields of a vehicle. In certain scenarios, a driver or in-vehicle cameras (e.g., in case of assisted and autonomous driving) require an unobstructed field-of-view of the path ahead from inside of a vehicle. Conventional windshield wiper systems that use multiple wiper blades usually have a cluttered design and do not sufficiently clear the windshield, which may hamper the unobstructed field-of-view of the path ahead.

In some conventional wiper systems, electrical motors are used to move one or more wiper blades to clean a windshield of a vehicle. The electrical motors include many mechanical components, such as gears and bearings, to slide the wiper blades. However, such sliding motion of the mechanical components creates significant friction resulting in the need for additional power to be supplied by the in-vehicle battery, which decreases vehicle range. Further, the gears and bearings of the conventional systems are susceptible to rust and wear, which may lead to poor and in-efficient cleaning of windshields. Such corrosion and system deterioration is especially true in geographical areas subject to harsh weather conditions, like significant rainfall or snowfall. When these systems corrode accident risk increases, and may result in driver-assist or autonomous-driving functionality being rendered inoperable.

In addition, as the curvature of windshields becomes more complex, conventional wiper systems have difficulty adapting to varying surface profiles and thus affecting their ability to effectively clean windshield contaminants. For example, conventional systems are not capable of effectively cleaning a windshield that curves around a driver, that is the windshield provides a view directly in front of the driver but also to the left and to the right. Further, conventional wiper systems have varying influence from aerodynamic effects as they traverse from the bottom of the windshield to the top and vice-versa, due to airflow vector changes.

Further limitations and disadvantages of conventional and traditional approaches will become apparent to one skilled in the art by comparing the described systems with some aspects of the present disclosure, as set forth in the remainder of the present application and with reference to the drawings. Hence, there is need for a new windshield wiper system that overcomes the aforementioned drawbacks.

SUMMARY

An electromagnetic windshield wiper system for a vehicle is substantially shown in, and/or described in connection with, at least one of the FIGURES, as set forth more completely in the claims.

This and other features and their advantages of the present disclosure may be appreciated from a review of the following detailed description of the present disclosure, along with the accompanying FIGURES in which like reference numerals refer to like parts throughout.

DETAILED DESCRIPTION

Figure 1A:
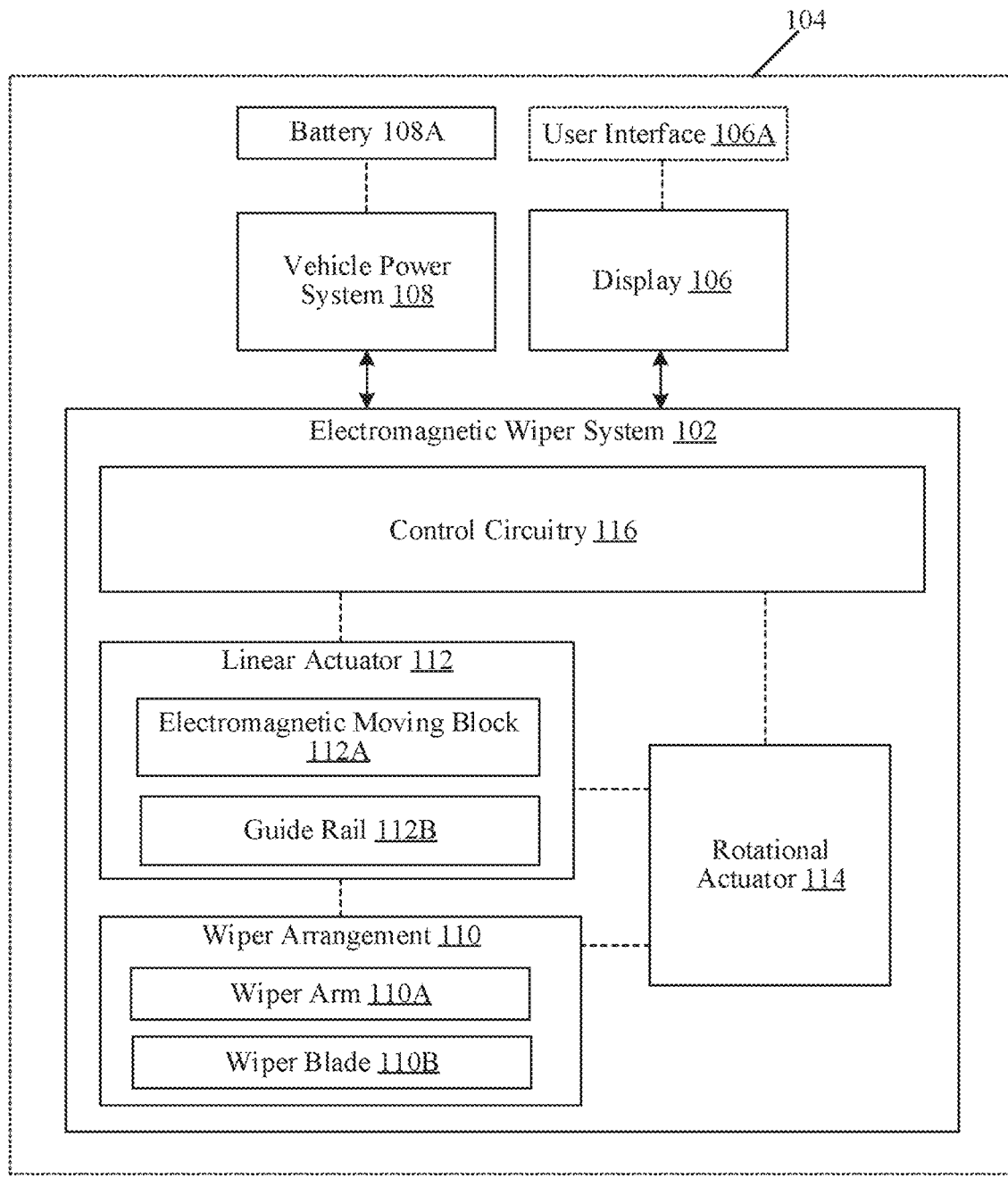
FIG. 1A is a block diagram that illustrates an exemplary electromagnetic wiper system, in accordance with an embodiment of the present disclosure.

The following described implementations may be found in the disclosed electromagnetic wiper system for a vehicle. The disclosed electromagnetic wiper system may have a modular architecture that can be readily installed in a vehicle. The electromagnetic wiper system includes a wiper-arrangement that may include a wiper arm and a wiper blade. The wiper arm and the wiper blade may be attached to each other, and thus, form a linear mono wiper in an uncluttered design.

The disclosed electromagnetic wiper system may further include a linear actuator that may include a guide rail and an electromagnetic moving block. The guide rail may include a plurality of permanent magnet bars that may be disposed horizontally along a curvature of the windshield of the vehicle. The electromagnetic moving block may act as an electromagnetic train, and may include a plurality of perforations and at least an electromagnetic coil that surrounds the plurality of perforations in the electromagnetic moving block. The disclosed electromagnetic wiper system may further include control circuitry that controls the linear motion of the electromagnetic moving block through the plurality of permanent magnet bars. The linear motion of the electromagnetic moving block through the plurality of permanent magnet bars may be controlled to steer the wiper arm that may be coupled to the electromagnetic moving block, back and forth across the entire length of the windshield to wipe a defined region, for example, the entire transparent area (i.e., near cent percent area) of the windshield. The plurality of permanent magnet bars may pass through the plurality of perforations surrounded by the electromagnetic coil in the electromagnetic moving block. This may result in minimal friction during the linear motion of the electromagnetic moving block. Alternatively stated, the disclosed electromagnetic wiper system may utilize the current carrying electromagnetic coil in the electromagnetic moving block to generate a magnetic induction-based electrodynamic force to steer the wiper arm, and is thereby able to efficiently and effectively minimize friction that otherwise may exist between the moving elements of a conventional wiper system.

In accordance with an embodiment, when not in operation, the control circuitry causes the linear mono wiper to be stowed beneath the hood of the vehicle. This improves the aerodynamic performance of the vehicle during operation, especially at high speeds, and reduces exposure to environmental damage, like direct sun exposure. In contrast to conventional wiper systems that do not apply a constant force on the windshield, the control circuitry according to the present disclosure adjust the inclination angle and/or angle of attack of the wiper arm with respect to a reference axis during the linear motion of the electromagnetic moving block. Such adjustment of the extent of inclination of the wiper arm may enable effective cleaning of the windshield and improve washer spray performance. As a result of the uncluttered design and almost frictionless movement of the electromagnetic moving block, the disclosed electromagnetic wiper system improved the field-of-view of the path for drivers, driver-assist functions, and autonomous-driving functions.

FIG. 1A is a block diagram that illustrates an exemplary electromagnetic wiper system, in accordance with an embodiment of the present disclosure. As shown in FIG. 1A an electromagnetic wiper system 102 is part of a vehicle 104. Vehicle 104 also includes a display 106, a user interface 106A for the display 106, a vehicle power system 108, and a battery 108A (or a battery-pack) for the vehicle power system 108 in the vehicle 104. As shown in FIG. 1A, the electromagnetic wiper system 102 includes a wiper arrangement 110, a linear actuator 112, a rotational actuator 114, and control circuitry 116 that is communicatively coupled to the linear actuator 112 and the rotational actuator 114. The wiper arrangement 110 includes a wiper arm 110A and a wiper blade 110B. The linear actuator 112 may further include an electromagnetic moving block 112A and a guide rail 112B.

Figure 1B:
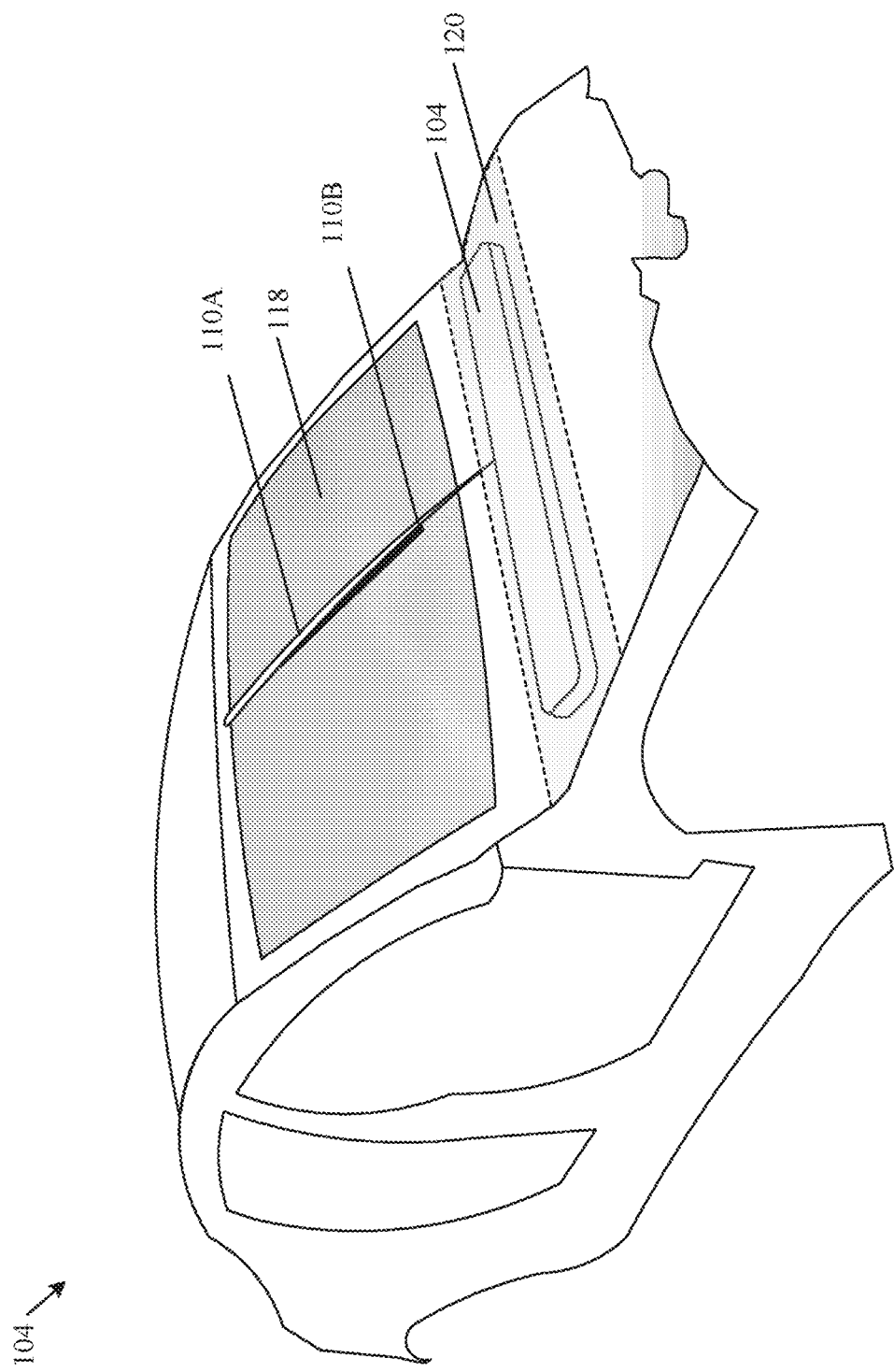
FIG. 1B illustrates the electromagnetic wiper system of FIG. 1A installed in a vehicle as a modular component of the vehicle, in accordance with an embodiment of the present disclosure.

In described embodiments, the electromagnetic wiper system 102 is a magnetic induction based windshield wiper system. The electromagnetic wiper system 102 may have a modular architecture. The electromagnetic wiper system 102 may be pre-formed as a sub-assembled module and subsequently installed into vehicle 104, thereby reducing the installation time during general assembly of components into vehicle 104. An exemplary embodiment of the electromagnetic wiper system 102 is shown in FIG. 1B. The control circuitry 116 of the electromagnetic wiper system 102 may control the linear actuator 112 and the rotational actuator 114 to steer the wiper arrangement 110 across the entire length of a windshield of the vehicle 104.

Vehicle 104 may be an electric vehicle, a hybrid vehicle, a vehicle with driver-assist capabilities, and/or a vehicle with autonomous-drive capabilities. In embodiments, the vehicle 104 may be an air-borne vehicle, a water-borne vehicle, or a hybrid of an air-borne, or a land-borne vehicle.

The display 106 may include suitable logic, circuitry, interfaces, and/or code that renders various types of information and controls via the user interface (UI) 106A.

UI 106A may be a customized graphical user interface (GUI) that displays the various types of information, controls, or settings to operate the electromagnetic wiper system 102. The electromagnetic wiper system 102 may also be controlled or operated by a hardware control button or a wiper switch provided in the vehicle 104. The display 106 may be a touch screen that receives an input from the one or more occupants of the vehicle 104. Examples of the display 106 include, but are not limited to a display of the infotainment head unit, a projection-based display, a see-through display, and/or an electro-chromic display.

The vehicle power system 108 may regulate the charging and the power output of the battery 108A to various electric circuits and the loads of the vehicle 104, such as the electromagnetic wiper system 102 and the display 106. In accordance with an embodiment, the vehicle power system 108 may include power electronics. The vehicle power system 108 may be communicatively connected to the control circuitry 116 to receive control signals from the control circuitry 116 (or an electronic control unit (ECU)) to modulate the current and power distribution for different operational components of the electromagnetic wiper system 102. The control circuitry 116 control a plurality of operational parameters of the electromagnetic wiper system 102 based on the adaptive modulation of the power and current to the different operational components of the electromagnetic wiper system 102. Exemplary parameters include, but are not limited to, the velocity of the electromagnetic moving block 112A, the angle of inclination of a wiper arm of the wiper arrangement 110 (or a change in the angle of inclination), the movement frequency of the wiper arm 110A, and the frequency that any washer fluid is released from a spray washer unit (not shown) and the duration of any such release.

The battery 108A may be a rechargeable source of electric power for one or more electric circuits or loads (not shown), such as the electromagnetic wiper system 102 and the display 106 of the vehicle 104. In some embodiments, instead of a single battery, a battery pack has a plurality of batteries arranged in a planar or non-planar array to power the vehicle 104.

Although not shown, the vehicle 104 may include an in-vehicle network, which provides communication channels and ports for communication between various control units, components, and/or systems of the vehicle 104, such as communication ports for exchanging data among the display 106, the control circuitry 116 of the electromagnetic wiper system 102, and other associated circuitry in the vehicle 104. The in-vehicle network may facilitate access control and/or communication between the control circuitry 116 and other ECUs, such as a telematics control unit (TCU) of the vehicle 104. Various devices or components in the vehicle 104 may connect to the in-vehicle network, in accordance with various wired and wireless communication protocols. Examples of the wired and wireless communication protocols for the in-vehicle network may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I.sup.2C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The wiper arrangement 110 includes the wiper arm 110A and the wiper blade 110B. The wiper arm 110A may be attached with the wiper blade 110B along a length of the wiper blade 110B to form a linear mono wiper providing an uncluttered design to the electromagnetic wiper system 102. At least one end of the wiper arm 110A may be coupled to the electromagnetic moving block 112A, and the other end may be a free end (i.e., not coupled to any structure), as shown, for example, in FIG. 1B. An example of the wiper arrangement 110 is shown and described in FIG. 1C.

Figure 1C:
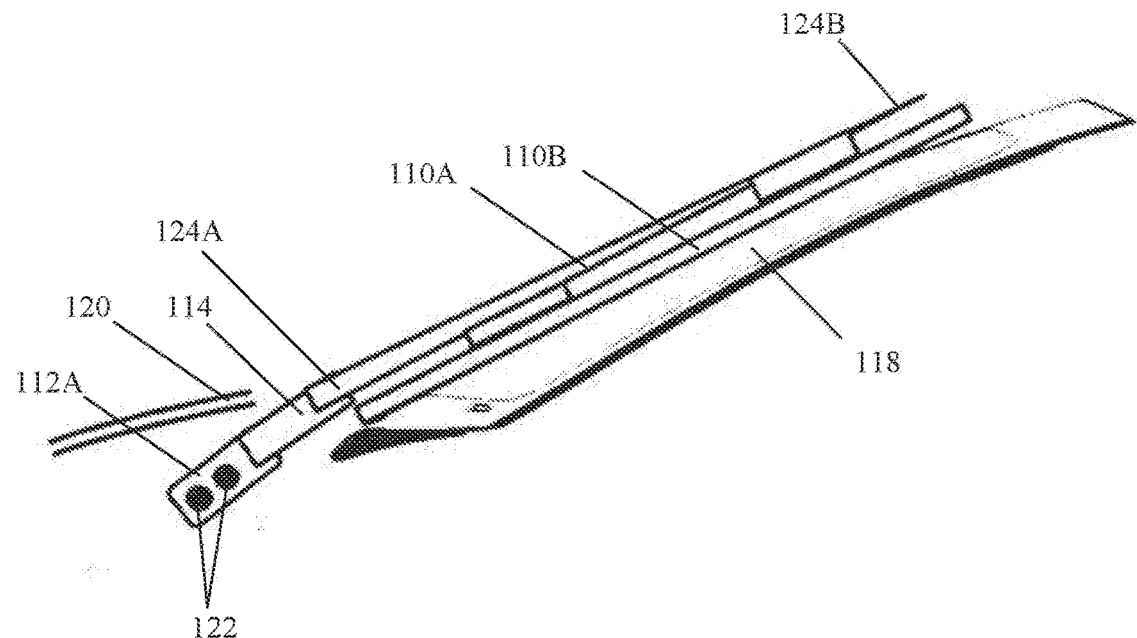
FIGS. 1C to 1E collectively illustrate different operative states of the exemplary electromagnetic wiper system of FIG. 1A, in accordance with an embodiment of the present disclosure.

As shown in FIG. 1C, the linear actuator 112 includes moving components that exhibit translational motion, for example the electromagnetic moving block 112A, and stationary (or affixed) components, for example, the guide rail 112B. The assembly of the electromagnetic moving block 112A and the guide rail 112B collectively move the wiper arm 110A of the wiper arrangement 110 in a linear motion along the length of a windshield of the vehicle 104. In embodiments, the linear actuator 112 is a linear motor, such as a linear inductor motion. In embodiments, the linear actuator 112 has mechanical components that convert the rotation of a motor shaft into a linear motion of the electromagnetic moving block 112A.

The rotational actuator 114 may have a fixed portion (e.g., a coupler) to connect to the electromagnetic moving block 112A. The rotational actuator 114 may include a shaft that attach to one end of the wiper arm 110A. Based on control signals from the control circuitry 116, the wiper arrangement 110 may be stowed and/or and the specific wiping angle may be set. For example, the shaft of the rotational actuator 114 may rotate to stow the wiper arrangement 110 and/or set or change the wiping angle. Rotational actuator 114 may be a stepper motor, servo motor, digital-servo motor, or another motor. An example of the rotational actuator 114 is shown and described in FIGS. 1C and 1D.

Figure 1D:
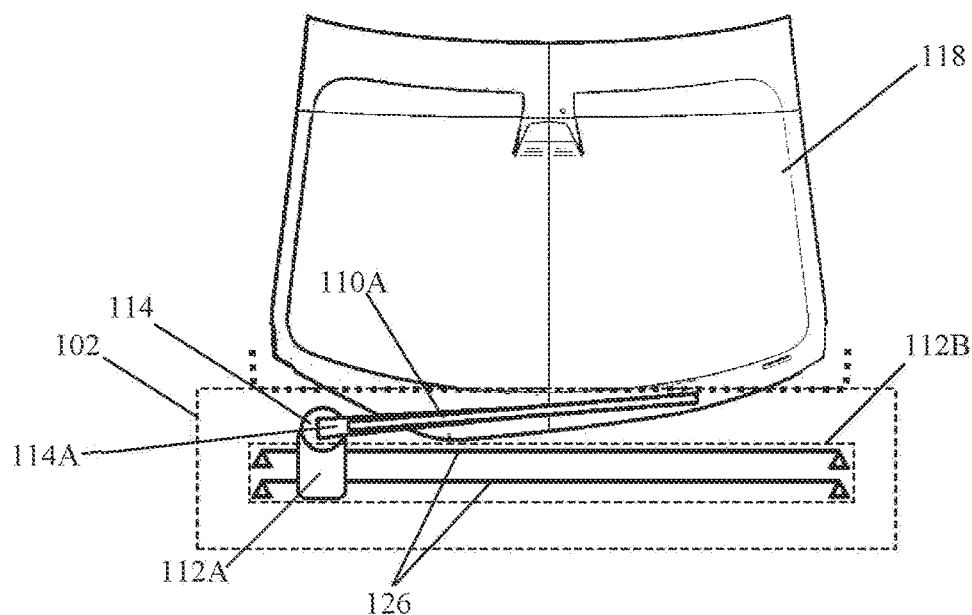
Figure 1E:
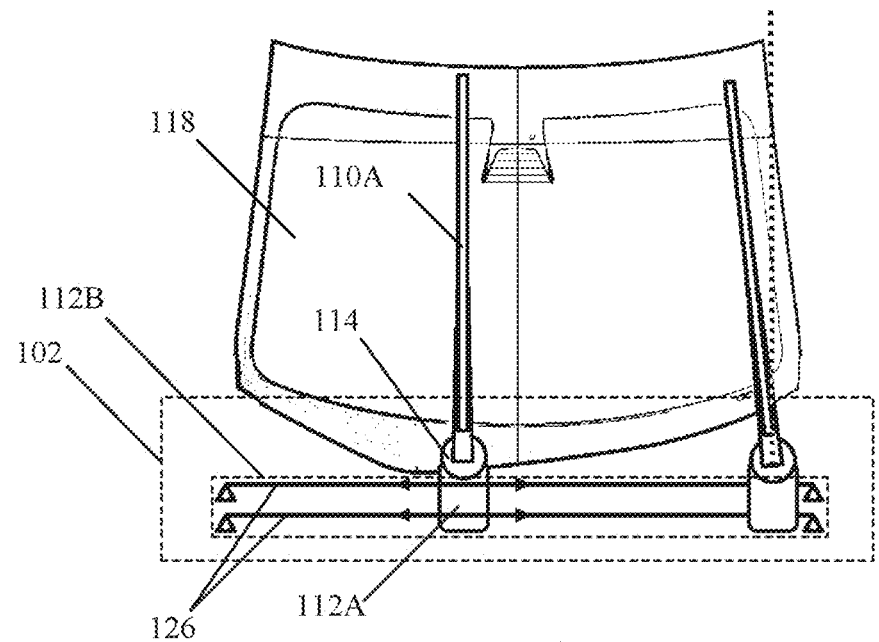

As shown in FIGS. 1D and 1E, the control circuitry 116 controls the linear motion of the electromagnetic moving block 112A along the guide rail 112B to allow steering of the wiper arm 110A coupled to the electromagnetic moving block 112A. The control circuitry 116 may also control other components of the electromagnetic wiper system 102, such as the linear actuator 112, a washer spray, and the rotational actuator 114. The control circuitry 116 may include, but is not limited to including, a microcontroller, an Application-Specific Integrated Circuit (ASIC) processor, a microcontroller, a state machine, and/or other processors or control circuits.

During operation, a trigger signal (or instruction) may be received at the control circuitry 116 of the electromagnetic wiper system 102 to initiate operation of the electromagnetic wiper system 102. Based on the received trigger signal, the control circuitry 116 may generate and transmit control signals (or control instructions) to the vehicle power system 108, to provide power specific to the linear actuator 112, the rotational actuator 114, or a spray washer attached with the wiper arrangement 110. The trigger signal may be received at the control circuitry 116 based on a user input. For example, a driver of the vehicle 104 may switch "ON" the wiper switch or select a UI control on the UI 106A via the display 106, to start the operation of the electromagnetic wiper system 102. In embodiments, the trigger signal is generated without human interaction with the vehicle 104, based on the one or more in-vehicle sensors, such as an in-vehicle camera, an in-vehicle radar, an in-vehicle moisture sensor, and/or in-vehicle camera or sensors coupled to a neural network that determines the presence of rain or another condition requiring clearing of the windshield. In embodiments, vehicle sensors (such as a camera or radar) capture a field-of-view through a defined region of the windshield. The sensors may detect a weather condition. Examples of the different weather conditions include, but are not limited to, snow fall, rain, wind, humid, smoke, fog, or arid weather condition. In some implementations, a degree of a weather condition may be further detected, for example, heavy rain fall, light snowfall, strong dirt carrying winds, and the like, which may impact visibility. The sensors may generate real time or near-real time trigger signals for auto-activation and controlled operations of the electromagnetic wiper system 102.

FIG. 1B illustrates the electromagnetic wiper system of FIG. 1A installed in a vehicle as a modular component of the vehicle, in accordance with an embodiment of the present disclosure. As show in FIG. 1B, vehicle 104 is fitted with the electromagnetic wiper system 102 as a modular component. FIG. 1B also shows a windshield 118 and a hood 120 that may be raised to provide a compartment that stows the wiper arrangement 110 when not in operation. The wiper arm 110A may be attached with the wiper blade 110B to form a mono wiper blade of the wiper arrangement 110. In embodiments, the control circuitry 116 is embedded within the chassis of the electromagnetic wiper system 102. In embodiments, the control circuitry 116 or one or more features of the control circuitry 116 is implemented in an ECU of vehicle 104.

FIGS. 1C to 1E collectively illustrate different operative states of the exemplary electromagnetic wiper system of FIG. 1A, in accordance with an embodiment of the present disclosure. As shown in FIG. 1C, wiper blade 110B is attached to the wiper arm 110A along a length of the wiper arm 110A. The wiper blade 110B may be in contact with the windshield 118 to physically wipe a defined region of the windshield 118. FIG. 1C also shows the positioning of the electromagnetic moving block 112A of the linear actuator 112 and the rotational actuator 114 below the hood 120 of the vehicle 104.

In accordance with an embodiment, the electromagnetic moving block 112A includes a plurality of perforations 122. The electromagnetic moving block 112A may be also referred to an electromagnetic train. The electromagnetic moving block 112A may be mounted on the guide rail 112B such that the guide rail 112B passes through the plurality of perforations 122. The guide rail 112B may be one or a plurality of permanent magnet bars. The number of perforations in the electromagnetic moving block 112A may be equal to the number of permanent magnet bars. At least one electromagnetic coil may be provided within the electromagnetic moving block 112A to surround the plurality of perforations 122 in the electromagnetic moving block 112A.

In accordance with an embodiment, one end, such as a first end 124A, of the wiper arm 110A is coupled to the electromagnetic moving block 112A and the other end, such as a second end 124B, may be a free end, as shown. In some embodiments, the first end 124A of the wiper arm 110A is coupled to the rotational actuator 114, which in turn is coupled to the electromagnetic moving block 112A.

FIG. 1D illustrates the electromagnetic wiper system 102 with the wiper arm 110A in a stowed mode. Also shown is the guide rail 112B that includes a plurality of permanent magnet bars 126 disposed horizontally along a curvature of the windshield 118 of the vehicle 104. In an embodiment, the guide rail 112B is affixed to a chassis of the electromagnetic wiper system 102. The chassis may be further affixed to the body of the vehicle 104. The electromagnetic moving block 112A may be mounted on the guide rail 112B such that the plurality of permanent magnet bars 126 of the guide rail 112B pass through the plurality of perforations 122 present in the electromagnetic moving block 112A. The control circuitry 116 may direct rotational actuator 114 to stow components of the wiper arrangement 110, such as the wiper arm 110A under the hood 120 of the vehicle 104.

In accordance with an embodiment, the rotational actuator 114 includes a shaft 114A. The shaft 114A may be attached to the first end 124A of the wiper arm 110A and the control circuitry 116 may control the rotation of the shaft 114A. Using the rotational actuator 114 the control circuitry 116 may send signals to stow the wiper arrangement 110 and set specific attack angles for wiping the windshield 118. The attack angle is the angle of the wiper arm 110A with respect to the windshield 118. In other embodiments, the wiper arm 110A is rotated without the use of the rotational actuator 114. For example, the wiper arm 110A is rotated by applying differential forces on the electromagnetic moving block 112A by the plurality of permanent magnet bars 126.

As shown in FIG. 1E, the control circuitry 116 may control a linear motion of the electromagnetic moving block 112A through the plurality of permanent magnet bars 126 to steer the wiper arm 110A coupled to the electromagnetic moving block 112A, back and forth across a length of the windshield 118 to wipe a defined region of the windshield 118.

In embodiments, the guide rail 112B includes straight permanent magnet bars disposed along the entire length of the windshield 118. In such embodiments, the wiper arrangement 110, including the wiper arm 110A, moves in a straight line along the length of the windshield 118 of the vehicle 104. In embodiments, the guide rail 112B includes a plurality of curved permanent magnet bars (not shown) parallel to the curvature of the windshield 118. In such embodiments, the wiper arrangement 110, including the wiper arm 110A, moves along the curvature of the windshield 118. In other embodiments, the curved permanent magnet bars have a different curvature compared to the curvature of the windshield 118. In embodiments, the control circuitry 116 controls the attack angle of the wiper arm 110A to ensure that the wiper arm stays in contact with the windshield 118. In other embodiments, a mechanical part, such as a spring, maintains the wiper arm 110A in contact with windshield 118.

In accordance with an embodiment, in response to the received trigger signal, the control circuitry 116 of the electromagnetic wiper system 102 positions the wiper arm 110A, including the wiper blade 110B attached to the wiper arm 110A, at a specific inclination angle, for example, an inclination angle of approximately "90.degree." (i.e., an upright position) with respect to a longitudinal axis of the windshield 118. The wiper arm 110A may be positioned at the specific inclination angle from a previous position of the wiper arm 110A, for example, an inclination angle near "0.degree." (e.g., in the stowed mode). The positioning of the wiper arm 110A at the specific inclination angle with respect to the longitudinal axis may be done by use of the rotational actuator 114. Based on the received trigger signal, the rotational actuator 114 may rotate the shaft 114A. Then, the control circuitry 116 may cause an electrodynamic force to be induced to move the electromagnetic moving block 112A through the plurality of permanent magnet bars 126 in a linear motion. Using this electrodynamic force produces minimal friction compared to conventional systems. To reduce friction, an air gap between the electromagnetic moving block 112A and the permanent magnet bars 126 may be created. Alternatively, oil or grease may be placed in the plurality of perforations 122 to reduce friction.

In embodiments, the control circuitry 116 may be further control a spray fluid that may be used to clean the windshield 118. To improve cleaning, a consistent blade force of the wiper blade 110B on the windshield 118 may be maintained throughout the back and forth movement of the wiper arm 110A.

Figure 1F:
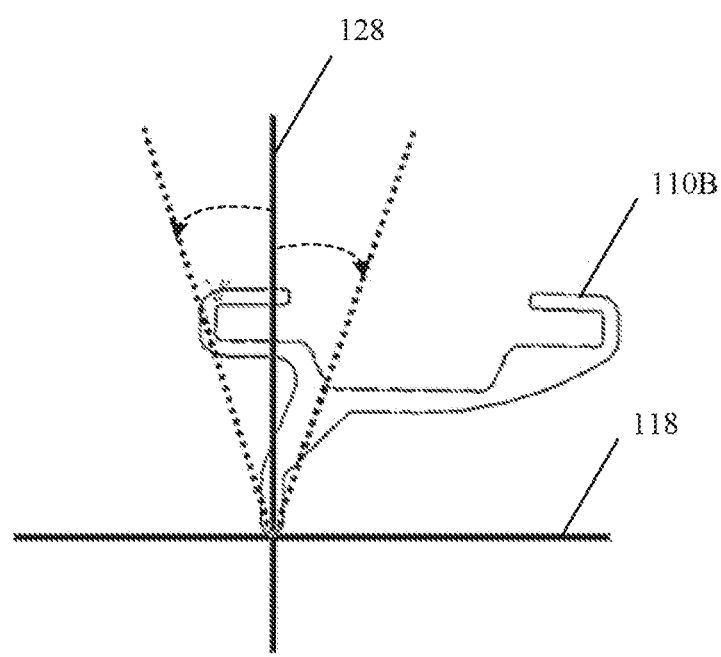
FIG. 1F illustrates an extent of the angle of attack of a wiper arm of the exemplary electromagnetic wiper system of FIG. 1A with respect to a reference axis, in accordance with an embodiment of the present disclosure.

FIG. 1F illustrates an extent of the angle of attack of a wiper arm of the exemplary electromagnetic wiper system of FIG. 1A with respect to a reference axis, in accordance with an embodiment of the present disclosure. With reference to FIG. 1F, there is shown a reference axis 128, which is perpendicular to the linear motion of the electromagnetic moving block 112A and may be considered to be parallel to at least a portion of the windshield 118. The control circuitry 116 may adjust the angle of attack and/or the inclination angle of the wiper arm 110A with respect to the reference axis 128 during the linear motion of the electromagnetic moving block 112A.

The angle of attack for the wiper arm 110A (or wiper blade 110B) may be adjusted within a range (for example, "−6.degree. to +6.degree." with respect to the reference axis 128). The inclination angle and angle of attack may be adjusted based on a defined criteria, such as a weather condition, a type of deposit (for example, soil, water, or snow) accumulated on the windshield 118, a priority setting to first wipe a driver-sensitive region of the windshield 118, or other defined conditions that may facilitate the wiper arm 110A to clear the desired area of the windshield 118, such as a maximum area, the area in front of the certain sensors, or another area of the windshield 118. The inclination angle may also be adjusted to define the coverage area for wiping.

The rotational actuator 114 may be an operational component of the electromagnetic wiper system 102 that performs the angular displacement of the wiper arm 110A. At a given time, the wiper arm 110A may be inclined at a specific inclination angle with respect to the reference axis 128. For example, in a non-operational state, the wiper arm 110A may be inclined at "0 degree" or near "0" degree inclination angle beneath the hood 120 of the vehicle 104. In operational state, the wiper arm 110A may be inclined at a specific inclination angle, such as "90 degrees" (+/−6 degrees) with respect to the reference axis 128. After the specific inclination angle is set as per the defined criteria for the wiper arm 110A, the linear actuator 112 may be activated to move the wiper arm 110A along the length of the windshield 118. The control circuitry 116 may control the supply of current/power to the electromagnetic coil within the electromagnetic moving block 112A, to induce a time-varying/moving magnetic field within the electromagnetic moving block 112A. As a result of the design, and almost frictionless movement of the electromagnetic moving block, the disclosed electromagnetic wiper system 102 is more power efficient that traditional systems, while also providing an unobstructed field-of-view for sensors and/or drivers of the vehicle 104. This may facilitate drivers, driver-assist functionality, and/or autonomous-driving functionality to make precise and quick decisions. Both the inclination angle and the angle of attack may be adjusted over time based upon operational conditions and/or linear position of the electromagnetic moving block 112A.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process. It will also be appreciated that one or more of the elements depicted in the drawings/FIGURES can also be implemented in a more separated or integrated manner, or even removed or rendered as inoperable in certain cases, as is useful in accordance with a particular application.

What is claimed is:

1. A method comprising:
    receiving real time sensor data from a plurality of devices associated with a vehicle, wherein the plurality of devices comprises at least an imaging device and a second device;
    analyzing, by a neural network, the real time sensor data;
    determining a presence of a precipitation-based weather condition based at least in part on said analyzing the real time sensor data;
    determining a presence of at least one of a non-precipitation condition based at least in part on said analyzing the real time sensor data;
    characterizing at least one of a degree of the determined precipitation weather condition or a degree of the determined non-precipitation condition; and
    modifying an operation of the vehicle based at least in part on said characterizing at least one of a degree of the determined precipitation weather condition or a degree of the determined non-precipitation condition.

2. The method of claim 1, wherein the imaging device is configured to capture a plurality of images of a field-of-view through a predefined region of a windshield of the vehicle, wherein the real time sensor data comprises the plurality of images.

3. The method of claim 1, wherein the second device comprises a device other than an imaging device.

4. The method of claim 1, wherein the second device comprises a moisture sensor.

5. The method of claim 1, wherein the second device comprises a radar device.

6. The method of claim 1, wherein the precipitation-based weather condition or the non-precipitation condition negatively affects visibility through a window of the vehicle.

7. The method of claim 6, wherein the precipitation-based weather condition corresponds to a presence of a weather element other than rain.

8. The method of claim 7 wherein the non-precipitation condition corresponds to a presence of smoke proximate to the vehicle.

9. The method of claim 1, wherein the non-precipitation condition corresponds to a presence of wind having a wind speed that satisfies a threshold wind speed.

10. The method of claim 1, wherein said modifying the operation of the vehicle comprises at least one of activating a window management system or deactivating the window management system.

11. The method of claim 10, wherein the window management system is a windshield wiper system.

12. The method of claim 1, wherein said modifying the operation of the vehicle comprises activating an electromagnetic wiper system of the vehicle, wherein said activating the electromagnetic wiper system of the vehicle comprises controlling a linear actuator to cause linear motion of an electromagnetic moving block through a plurality of permanent magnet bars disposed horizontally along a curvature of a windshield of the vehicle to steer a wiper arm that is coupled to the electromagnetic moving block.

13. A method comprising:
    receiving real time sensor data from a plurality of devices associated with a vehicle;
    analyzing, by a neural network, the real time sensor data;
    determining a presence of a first weather condition based at least in part on said analyzing the real time sensor data;
    determining a presence of a second condition based at least in part on analyzing the real time sensor data, wherein the second condition is different from the first weather condition;
    characterizing at least one of a degree of the determined first weather condition or a degree of the determined second condition; and
    modifying an operation of the vehicle based at least in part on the characterizing at least one of the degree of the determined first weather condition or the degree of the determined second condition.

14. The method of claim 13, wherein the plurality of devices comprises an imaging device is configured to capture a plurality of images of a field-of-view through a predefined region of a windshield of the vehicle, wherein the real time sensor data comprises the plurality of images.

15. The method of claim 13, wherein the plurality of devices comprises at least one of a radar device or a moisture sensor.

16. The method of claim 13, wherein the first weather condition corresponds a presence of at least one of snowfall, fog, rain, smoke, or wind, and wherein the second weather condition corresponds a presence of a different one of the at least one of the snowfall, the fog, the rain, the smoke, or the wind.

17. A method comprising:
    receiving first real time sensor data from an imaging device associated with a vehicle, receiving second real time sensor data from a non-imaging device associated with the vehicle;

analyzing, using machine learning, the first real time sensor data and the second real time sensor data;

determining a presence of a precipitation weather condition based at least in part on said analyzing;

determining a presence of a non-precipitation weather condition based at least in part on said analyzing; and modifying an operation of the vehicle based at least in part on characterizing at least one of a degree of the determined precipitation weather condition or a degree of the determined non-precipitation condition.

18. The method of claim 17, wherein the imaging device comprises at in-vehicle camera, and wherein the non-imaging device comprises at least one of an in-vehicle radar device or an in-vehicle moisture sensor.

19. The method of claim 17, wherein the non-precipitation condition corresponds a presence of at least one of snowfall, fog, smoke, or wind.

* * * * *